United States Patent [19]

Stipp

[11] Patent Number: 5,433,962
[45] Date of Patent: Jul. 18, 1995

[54] RAPIDLY SOLUBLE FLAVORED INSTANT COFFEE PRODUCT

[75] Inventor: Gordon K. Stipp, Cincinnati, Ohio

[73] Assignee: The Procter & Gamble Company, Cincinnati, Ohio

[21] Appl. No.: 296,291

[22] Filed: Aug. 25, 1994

[51] Int. Cl.⁶ .......................... A23F 5/14; A23F 5/12
[52] U.S. Cl. ..................... 426/96; 426/385; 426/594
[58] Field of Search .................. 426/594, 385, 96

[56] References Cited

U.S. PATENT DOCUMENTS

| | | | |
|---|---|---|---|
| 2,832,686 | 4/1958 | Louder et al. | |
| 2,850,388 | 9/1958 | Peebles et al. | |
| 2,977,203 | 3/1961 | Sienkiewicz et al. | 23/313 |
| 3,080,235 | 3/1963 | Hodson et al. | |
| 3,227,558 | 1/1966 | Richmond | |
| 3,300,315 | 1/1967 | Nava et al. | |
| 3,458,319 | 7/1969 | Block et al. | |
| 3,493,388 | 2/1970 | Hair | |
| 3,560,218 | 2/1971 | Whelan | |
| 3,615,669 | 10/1971 | Hair et al. | |
| 3,652,293 | 3/1972 | Lombana et al. | |
| 3,653,911 | 4/1972 | Mancuso et al. | |
| 3,706,572 | 12/1972 | Einstman et al. | |
| 3,713,842 | 1/1973 | Lubsen et al. | |
| 3,869,555 | 3/1975 | Heonis | 426/134 |
| 3,892,867 | 7/1975 | Schoonman | 426/93 |
| 4,001,448 | 1/1977 | Finucane et al. | 426/285 |
| 4,022,916 | 5/1977 | La Tour | 426/285 |
| 4,076,847 | 2/1978 | Johnson et al. | 426/78 |
| 4,318,932 | 3/1982 | Ewing et al. | 426/285 |
| 4,338,349 | 7/1982 | Franklin et al. | 426/631 |
| 4,378,380 | 3/1983 | Scarpellino et al. | 426/594 X |
| 4,438,147 | 3/1984 | Hedrick, Jr. | 426/570 |
| 4,497,835 | 2/1985 | Winston | 426/72 |
| 4,554,167 | 11/1985 | Sorge et al. | 426/285 |
| 4,594,256 | 6/1986 | Zemelman et al. | 426/594 |
| 4,594,257 | 6/1986 | Leblanc et al. | 426/594 |
| 4,619,833 | 10/1986 | Anderson | 426/548 |
| 4,640,839 | 2/1987 | Hsu | 426/285 |
| 4,980,181 | 12/1990 | Camp et al. | 426/98 |
| 5,051,269 | 9/1991 | Noreille et al. | 426/453 |
| 5,264,228 | 11/1993 | Pray et al. | 426/285 |
| 5,284,674 | 2/1994 | Fazio | 426/580 |

FOREIGN PATENT DOCUMENTS

| | | |
|---|---|---|
| 75953/91 | 11/1991 | Australia. |
| 109454 | 5/1984 | European Pat. Off. |

OTHER PUBLICATIONS

Harper, W. J.; "Synthetic and Imitation Dairy Products"; Synthetic and Imitation Dairy Products; vol. 22; pp. 465–498.

Pintauro, N. D.; "Falling Curtain Process" Agglomeration Techniques, Coffee Solubilization—Commerical Processes and Techniques; Noyes Data Corp.; 1975; pp. 177–209.

*Primary Examiner*—Joseph Golian
*Attorney, Agent, or Firm*—Brahm J. Corstanje; Tara M. Rosnell

[57] ABSTRACT

The present invention relates to a flavored instant coffee product comprising a creamer base, a sweetener base, and a flavor base, wherein the creamer base is agglomerated to the sweetener base, and the flavor base is coated on the agglomerated creamer and sweetener bases, and wherein the flavor base comprises instant coffee and flavorings. The present invention further relates to a process for making such a flavored instant coffee product.

18 Claims, No Drawings

RAPIDLY SOLUBLE FLAVORED INSTANT COFFEE PRODUCT

FIELD

The present invention relates to instant coffee. More specifically, the present invention relates to a rapidly soluble flavored instant coffee product.

BACKGROUND

A relatively new entrain to the instant coffee market is flavored instant coffee. Typically a flavored instant coffee contains a mechanical mixture of instant coffee particles, creamer base, sweetener base, and flavorings. Unfortunately, the rate of solubility of these individual components differs, such that the desired ratios of the components do not completely dissolve. For example, the creamer base typically comprises a fatty component and is therefore hydrophobic. As a result, the creamer tends to dissolve less completely or less rapidly as compared to the other components. This, in turn, leaves aesthetically unappealing clumps of undissolved instant coffee product floating on the top of the beverage or as sediment in the bottom of the drinking vessel. This hydrophobic property is also characteristic of other fatty materials, such as chocolate, whole milk solids, whole cream solids and flavor oils, frequently included in flavored instant coffee beverages. Other problems associated with known flavored instant coffee beverages include segregation of low and high density particles in the dry mix. Such segregation results in nonuniform ingredient composition between spoonfuls of dry product. This non-uniformity is particularly prevalent in products sweetened with an artificial sweetener.

While vigorous shaking and stirring of such an instant coffee solution may eventually result in a completely dissolved product, this is unsatisfactory for the consumer. The characterization of "instant" should connote ease of preparation, such as little to no stirring, yet result in a readily dissolved product.

Based on the foregoing, there is a need for an flavored instant coffee product that is readily and uniformly soluble. It is therefore an object of the present invention to provide an flavored instant coffee product that is more readily and uniformly soluble as compared to flavored instant coffee products wherein the creamer and sweetener components occur as individual particles in the dry product.

SUMMARY

The present invention relates to a flavored instant coffee product comprising a creamer base, a sweetener base, and a flavor base, wherein the creamer base is agglomerated to the sweetener base, and the flavor base is coated on the agglomerated creamer and sweetener bases, and wherein the flavor base comprises instant coffee and flavorings.

The present invention further relates to a process for making such a flavored instant coffee product.

DETAILED DESCRIPTION

The present invention answers the need for an flavored instant coffee product that is more readily and uniformly soluble as compared to flavored instant coffee products wherein the creamer and sweetener components occur as individual particles (i.e., non-agglomerated) in the dry product.

The following is a list of definitions for terms used herein.

"Agglomeration" refers to the preparation of relatively larger particles by combining a number of relatively smaller particles into a single unit. Processes for accomplishing agglomeration are more fully discussed below.

"Bulk density" refers to the overall density of a plurality of particles measured in the manner described on pp. 130–131 of COFFEE PROCESSING TECHNOLOGY, Avi Publishing Company, Westport, Conn., 1963, Vol. II.

"FICP" means flavored instant coffee product.

"Creamer base" refers to a creamer or creamers useful in the FICP and process of the present invention. Such creamers include, but are not limited to, non-dairy creamers, synthetic and imitation dairy products, non-fat and whole milk solids. Preferred creamers include, non-dairy creamers made from vegetable fats, sugar, emulsifier, carbohydrates, sodium caseinate, and buffers. The creamer base may further include thickening agents such as modified food starches and/or natural and synthetic gums such as xanthan, cellulose gel (Avicel TM ), carrageenan and sodium carboxymethylcellulose. Additional creamers suitable for use in the FICP and process of the present invention include those synthetic and imitation dairy products disclosed in KIRK OTHMER ENCYCLOPEDIA OF CHEMICAL TECHNOLOGY, W. J. Harper, Willey Interscience, 3rd edition, Vol. 22, section entitled "Synthetic and Imitation Dairy Products", pp. 465–498, (1978). Preferably, the FICP of the present invention comprises from about 25% to about 55%, by weight of creamer; more preferably from about 30% to about 50%; more preferably still, from about 35% to about 45%.

"Sweetener base" refers to a sweetener or sweeteners useful for sweetening a beverage. Such sweeteners include natural and artificial sweeteners. Such natural sweeteners useful in the FICP and process of the present invention include, but are not limited to, sucrose, fructose, dextrose, maltose, lactose, or mixtures thereof. Such artificial sweeteners include, but are not limited to saccharin, cyclamates, acetosulfam K (Sunette TM ), L-aspartyl-L-phenylalanine lower alkyl ester sweeteners (e.g. Aspartame TM ); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethyalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986; and the like and mixtures thereof. Preferably the artificial sweeteners are combined with a bulking agent. Examples of such bulking agents include, but are not limited to, maltodextrins and polydextrose. Preferably, the FICP of the present invention comprises from about 25% to about 75%, by weight of sweetener; more preferably from about 40% to about 60%; more preferably still, from about 45% to about 55%. Such ranges are directly applicable to natural sweeteners. With regard to artificial sweeteners, such ranges refer to the % of an artificial sweetener and bulking agent mix, having a similar sweetness level to natural sweeteners. More preferably, the FICP of the present invention comprise from about 0.1% to about 3% of an artificial sweetener and from about 22% to about 72% of an artificial sweetener bulking agent; more preferably from about 0.1% to about 2% of an artificial sweetener and from about 38% to about 60% of an artificial sweetener bulking agent; more preferably still from about 0.1% to about 1% of an artificial sweetener and from about 44% to about 55% of an artificial sweetener bulking agent.

"Flavor base" refers to a component of the FICP of the present invention comprising instant coffee and flavorings; preferably the flavor base does not include sweeteners or creamers.

The instant coffee particles used in the product and process of the present invention can be prepared by any convenient process (discussed in more detail below). The instant coffee component can be any one of the commercially available instant coffees sold on the market, or combinations thereof. These include spray dried instant coffee powders, agglomerates and freeze-dried chunks. The coffee may be any single variety of coffee or a blend of different varieties. The coffee may be decaffeinated or undecaffeinated. The coffee may be processed to reflect a unique flavor characteristic such as expresso, French roast, or the like. Preferably, the FICP of the present invention comprises from about 3% to about 25%, by weight of instant coffee; more preferably from about 5% to about 20%; more preferably still, from about 6% to about 15%.

The flavorings useful in the FICP of the present invention include any one of the commercially available flavorings. Preferably, such flavorings are sourced from encapsulated or liquid flavorings. The flavorings may be natural or artificial in origin. Preferred flavorings include, but are not limited to, Almond Nut, Amaraetto, Anisette, Brandy, Cappuccino Chocolate, Chocolate Mint, Cinnamon, Cinnamon Almond, Creme de Menthe, Grand Mariner, Irish Creme, Kahlua, Macadamia Nut, Orange, Orange Leaf, Peppermint Stick, Pistachio, Raspberry, Sambuca, and Vanilla bean. Actual levels of flavoring added will depend upon the strength of flavor desired. Such levels are readily determined by one skilled in the art. Preferably, the FICP of the present invention comprises from about 0.1% to about 10%, by weight of flavoring(s); more preferably from about 0.1% to about 5%; more preferably still, from about 0.1% to about 3%.

"Comprising" means that other steps and other ingredients which do not affect the end result can be added to the process and/or resulting flavored instant coffee product of the instant invention. Accordingly, this term encompasses the terms "consisting of" and "consisting essentially of".

"cps" means centipoise.

"Mesh" refers to the number of apertures per square inch of a screen or sieve; i.e., it is the square of the number of strands of metal or plastic per linear inch. All references to mesh size herein refer to US Standard Sieve Series.

"PSD" means particle size distribution as defined on pp. 137-140 of COFFEE PROCESSING TECHNOLOGY, Avi Publishing Company, Westport, Conn., 1963, Vol II.

"psig" means pounds per square inch gauge.

All percentages are by weight of total composition unless specifically stated otherwise.

All ratios are weight ratios unless specifically stated otherwise.

The present invention relates to a FICP comprising a creamer base, a sweetener base, and a flavor base, wherein the creamer base is agglomerated to the sweetener base, and the flavor base is coated on the agglomerated creamer and sweetener bases, and wherein the flavor base comprises instant coffee and flavorings. Such a FICP results in a surprisingly increased rate of solubility when mixed with an aqueous solution (e.g., water), as compared to instant coffee products wherein the creamer and sweetener bases are not agglomerated to one another. The FICP also has an improved flowability and uniform density as compared to instant coffee products wherein the creamer and sweetener bases are not agglomerated to one another. Furthermore, the FICP has a reduced tendency to segregate during packing and trade handling (e.g., shipping).

The present invention further relates to a process for making a flavored instant coffee product, the process comprising agglomerating a creamer base to a sweetener base, and coating the agglomerated sweetener and creamer bases with a flavor base, wherein the flavor base comprises instant coffee and one or more flavorings.

Many specialized processes and types of processing equipment have been developed for the agglomeration of particulate solids. (See generally, Pintaufo, N.D., COFFEE SOLUBILIZATION COMMERCIAL PROCESSES AND TECHNIQUES, Noyes Data Corporation, "Agglomeration Techniques", pp. 177-209, (1975)). However, the same basic operating principles are involved in practically all cases. An agglomerating fluid, e.g., oil, liquid water or steam, is uniformly distributed throughout the particles to be agglomerated, causing part or all of the particles to become tacky. The particles are then agitated, allowing the tacky particles to contact and adhere to other particles. Proper control of the amount of agglomerating fluid and the type and time of agitation will provide control over the final size of the agglomerated product.

Applicants, however, have discovered that steam agglomeration produces a surprisingly superior FICP, as compared to FICP produced by alternative methods of agglomeration. For example, agglomeration methods which use water typically result in a high density product which does not quickly dissolve.

A typical steam agglomeration procedure useful for purposes of the present invention involves the following general steps. A plane of discretely arranged creamer base and sweetener base particles are caused to move in a first direction preferably in the form of a falling curtain. These moving particles are contacted by a jet of steam, thereby redirecting the particles. As the particles in the curtain enter the path of the jet of steam, they immediately become wetted. By being directed in the path of the jet of steam, they are caused to contact one another, and subsequently agglomerate. (See, for example, U.S. Pat. No. 3,652,293, Lombana, Phillips and Gregg, Issued Mar. 28, 1972; U.S. Pat. No. 4,640,839, Hsu, issued Feb. 3, 1987; and U.S. Pat. No. 2,977,203, Sienkiewicz, Kohler and Schulman, issued Mar. 28, 1961).

The following is a general description of the process of the present invention.

Preferably the creamer base has a particle size of about 6-26% on 60 mesh, about 20-40% on 100 mesh and about 34-54% on 70 mesh; more preferably about 16% on 60 mesh, about 30% on 100 mesh and about 44% on 170 mesh.

Preferably, when the sweetener base is a natural sweetener, the sweetener base has a particle size of about 0–54% on 45 mesh, about 1–27% on 60 mesh, about 10–70% on 100 mesh and about 3–43% on 170 mesh; more preferably about 2% on 60 mesh, about 60% on 100 mesh and about 33% on 170 mesh.

The creamer base and sweetener base particles are blended in a ratio of from about 25:75 to about 75:25, more preferably from about 40:60 to about 60:40, more preferably still about 50:50. Blending may be conducted by ribbon blender, V blender, or the like.

The blended creamer base and sweetener base particles are subsequently agglomerated as follows. In a preferred embodiment, the blended particles are contacted with steam in a free-fall condition. The free-falling particles may be in a single curtain pattern or multiple curtain patterns. The steam of agglomeration may be either saturated or superheated. Additionally, air may be injected with the steam to facilitate displacement of the agglomerates from the steam contact zone. Preferably, the steam is applied such that about 1–4% moisture is added to the base particles. Preferably the particle surfaces are heated above the glass transition point to become tacky. This is achieved by varying the velocity and pressure of the steam. Furthermore, the steam velocity and pressure should be such that it is insufficient to cause damage to the creamer flavor. Suitable steam velocities are from about 200 to about 2,000 ft/sec, more preferably from about 250 to about 1,500 ft/sec, more preferably still from about 300 to about 1,000 ft/sec. Suitable steam pressures are from about 5 to about 75 psi, more preferably from about 10 to about 50 psi, more preferably still from about 15 to about 35 psi. The steam to creamer and sweetener base blend ratio will vary from about 0.01:1 to about 1:1, more preferably from about 0.01:1 to about 0.5:1, more preferably still from about 0.01:1 to about 0.01:1. Preferably, the application of steam results in sufficient moisture addition to cause the particles to have a resulting moisture content of from about 1% to about 4%, more preferably from about 2% to about 3%.

The hot moist product is subsequently allowed to solidify below the glass transition point. This is preferably accomplished by residence time on a moving belt or cooling air moving across the agglomerate. During this treatment, the carbohydrates crystallize from an amorphous form. Typically at least about 60 to about 120 seconds at ambient temperature is necessary to accomplish this phase change. This step is referred to as "setting".

The creamer/sweetener base agglomerates are subsequently dried to minimize flavor deterioration and caking. Preferably such drying occurs in an atmosphere which minimizes possible agglomerate-to-agglomerate agglomeration. Such drying is suitably practiced in the lower section of a tower while the agglomerates are still in free-fall. A dryer air temperature (inlet) above about 140° F. (about 60° C.) and below about 190° F. (about 88° C.) is preferred, more preferably above about 150° F. (about 66° C.) and below about 180° F. (about 82° C.). Alternatively, the agglomerated creamer and sugar base may be dried on a vibratory dryer (e.g., Jeffrey or fluidized bed dryer) using similar conditions.

Preferably, this material is cooled to ambient temperature upon its discharge from the dryer. Preferably, the creamer/sweetener base agglomerates are dried to less than about 2.5% moisture content, more preferably less than about 2.0%. This is achieved by adjusting the air flow, air temperature and residence time within the dryer.

After drying, the agglomerates may be screened to remove undersized and oversized particles, and/or to modify density.

The creamer/sweetener base agglomerates are subsequently coated with a flavor base. Such coating is achieved by mixing the agglomerates with the flavor base. The porosity of the agglomerates facilitates the coating step by providing voids within the agglomerate for deposition of the flavor base particles. Preferably the flavor base particles used for coating are ground to a particle size of less than 200 mesh. The coating is preferably done in a gentle mixing system to reduce/prevent agglomerate breakup. Preferably a ramble type mixer or a V-blender is employed.

The finished product has a preferred particle size distribution of about 6–13% on 12 mesh, 39–67% on 30 mesh, 9–21% on 45 mesh, 2–15% on 60 mesh, and 2–13% on 100 mesh.

The finished product has a preferred bulk density of from about 0.3 g/cc to about 0.7 g/cc, more preferably from about 0.4 g/cc to about 0.6 g/cc, more preferably still about 0.5 gm/cc.

The finished product is further characterized as having an improved flowability compared to a dry mix of the same ingredients. Typically, a dry mix of the starting materials will readily bridge (i.e., particles will pack when attempting to flow through a small opening), whereas the FICP of the present invention will freely flow through such an opening.

The instant coffee used in the FICP and process of the present invention can be prepared by any convenient process. A variety of such processes are known to those skilled in the art. Conventionally, instant coffee is prepared by roasting and grinding a blend of coffee beans, extracting the roast and ground coffee with water to form an aqueous coffee extract, and drying the extract to form "instant coffee." Typical roasting equipment and methods for roasting coffee beans are described, for example, in Sivetz & Foote, COFFEE PROCESSING TECHNOLOGY, Avi Publishing Co., Westport, Conn., 1963, Vol. 1, pp. 203–226. Typical oil expelling equipment is described, for example, in Sivetz, COFFEE PROCESSING TECHNOLOGY, Avi Publishing Co., Westport, Conn., 1963, Vol. 2, pp. 27–30; typical grinding equipment is described, for example in Sivetz & Foote, supra, pp. 239–250. Typical disclosures of equipment and methods which can be used for extracting coffee include: Sivetz, supra, pp. 43–46; U.S. Pat. No. 2,562,206, Nutting, issued Jul. 31, 1951; Sivetz & Foote, supra, pp. 261–378; and U.S. Pat. No. 2,515,730, Ornfelt, issued Jul. 18, 1950. Typical disclosures of spray drying processes which can be used to prepare instant coffee particles can be found, for example, in Sivetz & Foote, COFFEE PROCESSING TECHNOLOGY, Avi Publishing Co., Westport, Conn., 1963, Vol. 1, pp. 382–513; U.S. Pat. No. 2,771,343, Chase et al., issued Nov. 20, 1956; U.S. Pat. No. 2,750,998, Moore, issued Jun. 19, 1956; and U.S. Pat. No. 2,469,553, Hall, issued May 10, 1949.

Examples of instant coffees useful in the FICP and process of the present invention, include but are not limited to those disclosed in U.S. Pat. No. 3,436,227, Bergeron et al., issued Apr. 1, 1969; U.S. Pat. No. 3,493,388, Hair, issued Feb. 3, 1970; U.S. Pat. No. 3,615,669, Hair et al., issued Oct. 26, 1971; U.S. Pat. No. 3,620,756, Strobel and Artman, issued Nov. 16, 1971; U.S. Pat. No. 3,637,397, Menzies and McSwiggin, issued Jan. 25, 1972; U.S. Pat. No. 3,652,293, Lombana et al., issued Mar. 28, 1972.

In one embodiment of the present invention, the FICP further comprises a thickening agent. The thickening agent enhances the body and mouthfeel characteristics of the FICP. The thickening agent also helps prevent sedimentation of the reconstituted dry beverage mix, particularly when cocoa solids are used in the formulation. Preferably the FICP of the present invention comprises from about 0.01% to about 3% by weight of a thickening agent, more preferably from about 0.01% to about 2.0%, more preferably still from about 0.01% to about 1%.

Any food grade thickening agent can be used in the FICP, provided that it is compatible with the other essential ingredients therein. Suitable thickening agents include, but are not limited to, cellulose gel (Avicel ™), carrageenan, cellulose derivatives, hydrocolloids, microencapsulated cellulose, sodium carboxymethylcellulose (CMC), various food starches (modified and unmodified) and xanthan. Selection of the thickening agent will be determined primarily by mouthfeel characteristics, cost and efficiency in producing the desired thickening enhancing characteristics. Other factors include rehydration in the finished beverage, cup appearance, and ability to suspend particulates (e.g., cocoa solids). CMC is preferred from a mouthfeel and flavor display standpoint. It has been further surprisingly discovered that co-agglomeration of the thickening agents with the creamer and sweetener bases enhances the rate of solubility and improves the cup appearance and sediment of the beverage. Without being bound by theory, it is believed that co-agglomeration of a thickening agent with the creamer and sugar bases improves the rate of re-hydration and subsequent viscosity development in the FICP.

The FICP of the present invention has a number of desirable characteristics. One such characteristic is wettability. When a spoonful of FICP is dropped into a receptacle (e.g., a cup) comprising an aqueous solution, it floats upon the surface for only a short time, followed by progressive sinking below the surface of the solution. "Wettability" refers to the time it takes for all the FICP to sink below the surface of the solution. Preferably, less than about 15 seconds is required for about 16 g of FICP to sink in 180 cc of distilled water at a temperature of about 77° C., in a 200 cc cup. More preferably, the FICP has a wettability of less than about 10 seconds, more preferably less than about 7 seconds, more preferably still less than about 5 seconds.

Another desirable characteristic of the FICP of the present invention is dissolution. The fact that a powdered product has wettability does not necessarily indicate it completely dissolves in solution, or that a rapid weltability automatically correlates with rapid and/or complete dissolution in solution. "Dissolution" refers to the time from which an aqueous solution is placed in a receptacle containing a FICP, accompanied by stirring, until the stirring utensil no longer has residue on it. Preferably less than about 10 seconds is required for dissolution of 16 g of the FICP in a 200 cc cup of 180 cc of distilled water at a temperature of about 77° C. More preferably the FICP of the present invention has a dissolution of less than about 10 seconds, more preferably less than about 7 seconds, more preferably still less than about 5 seconds.

The following examples further describe and demonstrate the preferred embodiments within the scope of the present invention. The examples are given solely for the purpose of illustration, and are not to be construed as limitations of the present invention since many variations thereof are possible without departing from its spirit and scope.

EXAMPLE 1

The solubility of an agglomerated FICP of the present invention is compared to a dry mix FICP of identical ingredients.

a. Agglomerated product

Commercial grade non-dairy creamer and fine grade sugar are blended in a ribbon blender for 5 minutes to form a 51% creamer and 49% sugar mixture. The resultant mixture is agglomerated with steam using an apparatus similar to that described in U.S. Pat. No. 3,652,293, Lombana, Phillips and Gregg, issued Mar. 28, 1972.

The dry mix sugar and creamer mixture is fed from an overhead hopper to a vibrating horizontal vibratory feeder. The mixture falls from the forward edge of the feeder onto a forming plate. The forming plate has multiple fluted channels to direct the flow of the material to the agglomeration zone.

The creamer and sugar mixture spills from the forming plates as discrete rods. A constant amount of material is fed to the vibratory feeder such that about 20 lbs/hour leave each forming trough. The falling stream of sugar and creamer mixture is exposed to jet of steam. The velocity of the steam jet is about 500 ft/min. at the point where the jet of steam is introduced to the falling stream of creamer and sugar. This is achieved using 26 psis steam pressure and a chute gap of ⅜ inch.

The creamer and sugar agglomerates are discharges onto a moving belt which provides about 70 seconds residence time for setting prior to drying. Residence times below about 30 seconds do not allow proper drying as the agglomerates are too sticky and can collapse and therefore become non-porous. The agglomerates are dried in a Jeffrey dryer at 165° F. (about 74° C.) air temperature for 60 seconds. The dried creamer/sweetener base agglomerates have a bulk density of 0.37 gm/cc and moisture content of 2.19% (oven dried for 16 hours at 105° C.).

The agglomeration and drying parameters are summarized as follows:

| Agglomeration Conditions | |
|---|---|
| Flute Chute Angle | 50° |
| Flute Chute Up (from nozzle) | 1-¼" |
| Flute Chute distance from nozzle | ⅜" |
| Number of Chutes | 4 |
| Width of Chutes | ⅜" |
| Steam Pressure | 26 |
| Steam Rate | 10–20 lbs./hr. |
| Agglomeration Steam Temp. at nozzle | 215–220° F. |
| Steam Nozzle Width | ¼" |
| Superheat | None |
| Agglomeration Air (psi) | None |
| Product Feed Rate | 80 lbs./hr. |
| Agglomerate Setting Time | 70 secs |
| Hood Heater | 80° F. |
| Jeffrey Dryer Conditions | |
| Steam Pressure | 20 psi |
| Air Temperature | 165° F. |
| Residence Time | 60 secs |
| Vibration Frequency | 817 rpm |

A chocolate FICP is made by blending 84.9% creamer/sweetener base agglomerate with 5% spray dried soluble coffee, 10% dutched lecithinated cocoa solids (10–12% fat), and 0.1% flavors. This blending results in the coating of the creamer/sweetener base agglomerate with the flavor base components (coffee, cocoa and other flavors). Both the soluble coffee and cocoa solids are ground to below 200 mesh size. The blended product has a bulk density of 0.44 gm/cc. The particle size distribution of the product is 10.9% on 12 mesh, 58.5% on 30 mesh, 13.6% on 45 mesh, 6.4% on 60 mesh, 4.5% on 100 mesh, and 6.2% on Pan.

b. Dry mix product

A dry mix of the identical ingredients from 1a, above, is made from 43.3% commercial grade non-dairy creamer, 41.6% fine grade sugar, 5% spray dried soluble coffee, 10% dutched lecithinated cocoa solids (10–12% fat), and 0.1% flavors. Both the soluble coffee and cocoa solids are ground to below 200 mesh size. The dry mixture has a bulk density of 0.73 gm/cc. The particle size distribution of the product is 0% on 12 mesh, 1% on 30 mesh, 4.8% on 45 mesh, 6.2% on 60 mesh, 43% on 100 mesh, and 45% on Pan.

c. Comparison of solubility

The solubility of the agglomerated and dry mix products is compared by measuring the wettability and dissolution of the products. The products are tested at 8.2% concentration (16 g/180 ml) in 180° F. (about 82° C.) distilled water. The agglomerated product has a wettability of 7 seconds, compared to 37 seconds for the dry mix. The agglomerated product has a dissolution of less than 5 seconds, compared to 15 seconds for the dry mix. Cup sediment was significantly reduced in the agglomerated product compared to the dry mix. The flavor of both the dry mix and agglomerated chocolate FICPs are indistinguishable in sensory evaluation by trained experts.

EXAMPLE 2

The solubility of an agglomerated FICP of the present invention containing gums is compared to a dry mix FICP of identical ingredients.

a. Agglomerated product 50.1% commercial grade non-dairy creamer, 48.1% fine grade sugar and 1.8% high molecular weight sodium carboxymethylcellulose gum (Aqualon 7H3SF) are blended in a ribbon blender for 5 minutes. The resultant mixture is agglomerated with steam and dried as described in Example 1a. The agglomerates have a bulk density of 0.36 gm/cc and a moisture content of 2.4%.

A chocolate FICP is made by blending 84.9% creamer/sweetener/gum base agglomerate with 5% spray dried soluble coffee, 10% dutched lecithinated cocoa solids (10–12% fat), and 0.1% flavors. Both the soluble coffee and cocoa solids are ground to below 200 mesh size. The blended product has a bulk density of 0.43 gm/cc. The viscosity of the reconstituted beverage is 3.2 cps (10% solution at 60° C. and 60 rpm using a Brookfield viscometer with small sample holder and LTV spindle). The base prepared in Example 1a, without the addition of gums, was 0.7 cps.

b. Dry mix product

A dry mix of identical ingredients is made from 42.6% non-dairy creamer, 40.8% fine grade sugar, 1.5% sodium carboxymethylcellulose gum, 5% spray dried soluble coffee, 10% dutched lecithinated cocoa solids (10–12% fat), and 0.1% flavors. Both the soluble coffee and cocoa solids are ground to below 200 mesh size. The dry mixture has a bulk density of 0.73 gm/cc. The viscosity of the reconstituted beverage is 3.6 cps (10% solution at 60° C. and 60 rpm using a Brookfield Model LVDV-III Rheometer with UL adapter and spindle Number 00).

c. Comparison of solubility

The solubility of the agglomerated and dry mix products containing gums are compared by measuring the wettability and dissolution of the products. The products are tested at 8.2% concentration (16 g/180 ml) in 180° F. (about 82° C.) distilled water. The agglomerated product has a wettability of 6 seconds, compared to 56 seconds for the dry mix. The agglomerated product has a dissolution of 5 seconds, as compared to 20 seconds for the dry mix product. Cup sediment was significantly reduced in the agglomerated product.

Comparison of these products to those of Example 1 shows that addition of sodium carboxymethylcellulose gums to dry mix products impairs solubility. However, agglomeration of the gums into the creamer and sugar base achieved the desired viscosity enhancement without affecting the solubility of the FICP.

EXAMPLE 3

The solubility of an agglomerated FICP of the present invention is compared to an agglomerated FICP produced by alternative agglomeration techniques.

a. Steam agglomerated product 40.7% commercial grade non-dairy creamer and 59.4% fine grade sugar are blended, agglomerated with steam, and dried as described in Example 1a. The agglomerates have a bulk density of 0.44 gm/cc and a moisture content of 1.0%. 84.9 parts steam agglomerated non-dairy creamer and sugar base is mixed with 10 parts dutched lecithinated cocoa solids (10–12% fat), 5 parts spray dried coffee and 0.1 parts flavors. The resulting FICP has a bulk density of 0.51 gm/cc.

b. Water aggglomerated product

45% commercial non-dairy creamer, 39.9% fine grade sugar, 10% dutched lecithinated cocoa solids (10–12% fat), 5% spray dried soluble coffee, and 0.1% flavors is dry blended in a ribbon blender. This mixture is agglomerated by spraying the dry blend with 6% water using a Bepex Turboflex Model TFX-4 (Bepex Corporation, Minneapolis, Minn.) and then dried at 100°–150° F. using a batch fluid bed dryer. The water agglomerated FICP has a moisture content of 3%. The agglomerates are sized through a 20 mesh screen and yielded a bulk density of 0.51 gm/cc.

c. Comparison of solubility

The solubility of the steam agglomerated and water agglomerated products are compared by measuring the wettability and dissolution of the products. The products are tested at 8.2% concentration (16 g/180 ml) in 185° F. (about 85° C.) distilled water. Both the steam agglomerated and water agglomerated product have a wettability of less than 5 seconds. However, their dissolutions are surprisingly different. The steam agglomeration product has a dissolution of 5 seconds with no cup sediment. In contrast, the water agglomerated product had a dissolution of 25 seconds and had significant cup residue.

The solubility enhancement of steam agglomeration is superior to that obtained with alternative water agglomeration techniques. Without being bound by theory, such a difference may be due to the unique "puffy"

porous structure of the non-dairy creamer/sugar base agglomerates resulting from steam agglomeration.

EXAMPLE 4

The criticality of coating key flavor components onto the agglomerated creamer/sweetener base agglomerate is demonstrated in a FICP of the present invention.

a. Creamer/sugar base agglomerates coated with a flavor base

42% commercial non-dairy creamer and 58% fine grade sugar is agglomerated with steam as described in Example 1a. The agglomerates have a bulk density of 0.42 gm/cc. A chocolate FICP is prepared by blending 84.9% creamer/sweetener base agglomerates with 6% soluble coffee, 9% dutched lecithinated cocoa solids (10–12% fat) and 0.1% flavors.

b. Dry mix and creamer/sugar/flavor base agglomerates 35.6% commercial non-dairy creamer, 49.3% fine grade sugar, 9% dutched lecithinated cocoa solids (10–12% fat), 6% spray dried soluble coffee, and 0.1% flavors is dry blended in a ribbon blender ("dry mix"). The resulting dry mix is agglomerated with steam as described in Example 1a ("agglomerated mix"). The agglomerated mix FICP has a bulk density of 0.45 gm/cc and is dark brown in color.

c. Comparison of flavor

The resulting flavor of the agglomerated mix of Example 4b versus the dry mix of Example 4b, was characterized by a strong cooked note, loss of chocolate flavor and an off aroma.

The resulting flavor of the agglomerated FICP of Example 4a versus the dry mix of Example 4b showed no detectable loss of flavor or change in character.

These results demonstrate the surprising importance of not subjecting key flavor ingredients to the steam from the agglomeration step. Without being bound by theory, it is believed the steam disrupts the flavor encapsulation matrix of the added flavors. This disruption accelerates the thermal and oxidative degradation of key flavor components in the FICP.

EXAMPLE 5

The effect of product density on wettability and dissolution is demonstrated for both a vanilla FICP and chocolate FICP of the present invention.

Commercial non-dairy creamer and fine grade sugar are blended at 49/51 and 53/47 weight ratios in a ribbon blender. Each mixture is agglomerated as described in Example 1a. Typical bulk density is 0.35 to 0.4 gm/cc. The density of the non-dairy creamer/sugar base agglomerates is increased by sizing through a 30 mesh screen. This allows making several finished products over a range of bulk densities.

A vanilla FICP product is made by blending 91.8% creamer/sweetener base agglomerates (53/47 blend) with 7% soluble coffee and 1.2% flavors.

A chocolate FICP product is made by blending 84.9% creamer/sweetener base agglomerate (49/51 blend) with 5% soluble coffee, 10% dutched lecithinated cocoa (10–12%) fat, and 0.1% flavor.

The same ingredients used for the above vanilla and chocolate products are also made into dry mix control products. In each case, both the soluble coffee and cocoa solids are ground to below 200 mesh size.

The solubility of the agglomerated products are compared by measuring the wettability and dissolution. The products are tested at 8.2% concentration (16 g/180 ml) in 170° F. (about 77° C.) distilled water. The effect of product density on solubility is shown in the following table:

| Product | Bulk Density (gm/cc) | Wettability (seconds) | Dissolution (seconds) |
|---|---|---|---|
| V*-Dry Mix | 0.74 | 40 | 12 (clumps) |
| V-Agglomerated | 0.74 | 17 | 10 (clumps) |
| V-Agglomerated | 0.56 | 17 | 3 (no clumps) |
| V-Agglomerated | 0.48 | 9 | 3 (no clumps) |
| C**-Dry Mix | 0.71 | 41 | 15 (clumps) |
| C-Agglomerated | 0.79 | 35 | 10 (clumps) |
| C-Agglomerated | 0.64 | 20 | 5 (no clumps) |
| C-Agglomerated | 0.50 | 6 | 5 (no clumps) |

*vanilla
**chocolate

Optimum product solubility is obtained with a bulk density below 0.64 gm/cc. The benefits of agglomeration are reduced if the porous creamer/sweetener base agglomerate structure is destroyed by densification grinding. FICP having improved solubility have a particle size distribution of 6–13% on 12 mesh, 39–67% on 30 mesh, 9–21% on 45 mesh, 2–15% on 60 mesh, 2–13% on 100 mesh and 5–95% on Pan.

EXAMPLE 6

A FICP of the present invention comprising milk chocolate is made as follows:

Commercial grade milk chocolate crumb comprising 12.5% chocolate liqueur, 31% milk solids, and 55% sucrose (Edan Vale) is agglomerated as described in Example 1a. Agglomerate bulk density is 0.4 gm/cc with a 1.75% moisture level. The agglomerated milk chocolate (sugar/milk solids/chocolate liquor) mixture is free flowing and non-hydroscopic.

94% agglomerated chocolate milk crumb is coated with, 5% soluble coffee, and 1% flavors. The soluble coffee particle size is less than 200 mesh.

The resulting FICP rapidly dissolves when added to hot water and yields a flavorful beverage.

EXAMPLE 7

A foaming cappuccino FICP of the present invention is made as follows:

43.5% fine grade sugar, 8.8% lactose, 27.1% commercial grade non-dairy creamer, 17.6% commercial grade foaming creamer and 2.9% carrageenan gum are blended in a ribbon blender. The mixture is agglomerated as described in Example 1a. Typical bulk density is 0.35–0.4 gm/cc. The creamer/sweetener/gum base agglomerate is free flowing and non-hydroscopic.

85% creamer/sweetener/gum base agglomerate and 15% expresso type soluble coffee is blended together. The soluble coffee particle size is less than 200 mesh. The cappuccino FICP rapidly dissolves when added to hot water, yielding a high foam head, thick creamy texture and good coffee flavor.

EXAMPLE 8

A reduced calorie FICP of the present invention is made as follows:

40% low fat milk solids, 59.7% maltodextrin (10 dextrose equivalent), 0.3% Aspartame TM, 2% carrageenan gum and 2% cellulose gel (Avicel TM) are blended in a ribbon blender. This mixture is agglomerated as described in Example 1a. Typical bulk density is 0.35–0.4 gm/cc. The creamer/sweetener/gum base agglomerates are free flowing, non-hydroscopic, with a good sweetness and thick creamy flavor profile.

75% creamer/sweetener/gum base agglomerate is blended with 15% lecithinated dutched cocoa solids (10–12% fat) and 10% soluble coffee. Both the cocoa solids and soluble coffee are less than 200 mesh size. The low calorie FICP rapidly dissolves when added to hot water yielding a flavorful beverage.

All publications and patent applications mentioned hereinabove are hereby incorporated in their entirety by reference.

It is understood that the examples and embodiments described herein are for illustrative purposes only and that various modifications or changes in light thereof will be suggested to one skilled in the art and are to be included in the spirit and purview of this application and scope of the appended claims.

What is claimed is:

1. A process for making a flavored instant coffee product, the process comprising:
    a) steam agglomerating a creamer base to a sweetener base to form an agglomerated creamer and sweetener base;
    b) setting the agglomerated creamer and sweetener base;
    c) drying the agglomerated creamer and sweetener base to a moisture content of less than about 2.5% by weight; and
    d) coating the agglomerated creamer and sweetener base with a flavor base, wherein the flavor base comprises instant coffee and one or more flavorings.

2. The process of claim 1, wherein the agglomerated creamer and sweetener base comprises a thickening agent.

3. The process of claim 2, wherein from about 1% to about 4% moisture is added during the steam agglomeration of step a).

4. The process of claim 1, wherein the flavored instant coffee product has a bulk density of from about 0.3 gm/cc to about 0.7 gm/cc.

5. The process of claim 4, wherein the flavored instant coffee product has a wettability of less than about 15 seconds.

6. The process of claim 5, wherein the flavored instant coffee product has a dissolution of less than about 10 seconds.

7. The process of claim 1, wherein the flavored instant coffee product has a wettability of less than about 5 seconds and a dissolution of less than about 5 seconds.

8. The process of claim 1, wherein the sweetener base comprises a natural sweetener.

9. The process of claim 1, wherein the sweetener base comprises an artificial sweetener.

10. The flavored instant coffee product produced by the process of claim 1.

11. The flavored instant coffee product produced by the process of claim 2.

12. The flavored instant coffee product produced by the process of claim 3.

13. The flavored instant coffee product produced by the process of claim 4.

14. The flavored instant coffee product produced by the process of claim 5.

15. The flavored instant coffee product produced by the process of claim 6.

16. The flavored instant coffee product produced by the process of claim 7.

17. The flavored instant coffee product produced by the process of claim 8.

18. The flavored instant coffee product produced by the process of claim 9.

* * * * *